United States Patent [19]

Spinelli

[11] Patent Number: 4,588,287
[45] Date of Patent: May 13, 1986

[54] FULL-FRAME ILLUMINATION AND IMAGING SYSTEM

[75] Inventor: Richard A. Spinelli, Rochester, N.Y.

[73] Assignee: Xerox Corporation, Stamford, Conn.

[21] Appl. No.: 733,819

[22] Filed: May 14, 1985

[51] Int. Cl.⁴ ................ G03B 27/44; G03B 27/54
[52] U.S. Cl. .......................... 355/46; 355/1; 355/40; 355/67
[58] Field of Search ............ 355/1, 46, 50, 67

[56] References Cited

U.S. PATENT DOCUMENTS

| | | | |
|---|---|---|---|
| 3,605,593 | 9/1971 | Anderson | 355/46 X |
| 3,617,125 | 11/1971 | Sobottke et al. | 355/46 |
| 3,697,177 | 10/1972 | Booth | 355/67 |
| 4,072,416 | 2/1978 | Waly | 355/46 |
| 4,318,610 | 3/1982 | Grace | 355/14 D |
| 4,333,723 | 6/1982 | Green et al. | 355/71 |
| 4,350,431 | 9/1982 | Mochizuki et al. | 355/1 |
| 4,382,672 | 5/1983 | Boykin | 355/67 X |
| 4,417,809 | 11/1983 | Nötzel et al. | 355/46 |
| 4,448,499 | 5/1984 | Tokumaru | 355/50 |

OTHER PUBLICATIONS

U.S. Ser. No. 637655, Durbin et al., filed 8/1984.
U.S. Ser. No. 637656, Durbin, filed 8/1984.

*Primary Examiner*—Richard A. Wintercorn

[57] ABSTRACT

A two-dimensional full frame illumination and imaging assembly is formed, in a preferred embodiment, by joining, in combination, a platen, platen housing extension and full frame lens array. The combined assembly is converted into a higly efficient, light directing cavity by making the sides of the platen and platen housing diffusely reflective. The top surface of the lens array, excluding the lenslet entrance aperture, is also made reflective. Light is then coupled into the housing through an aperture formed in at least one of the sides. The light undergoes multiple reflections from all sides of the assembly, providing illumination of the document whose relfection is transmitted by the lens array onto a photosensitive image plane.

3 Claims, 2 Drawing Figures

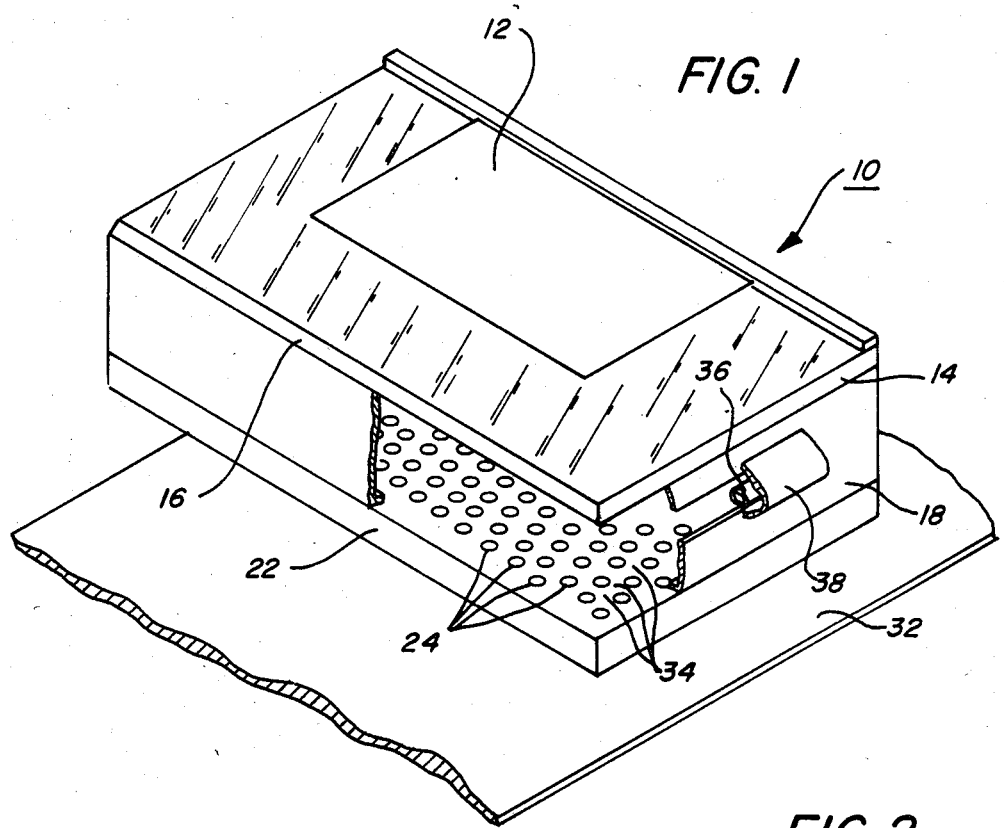
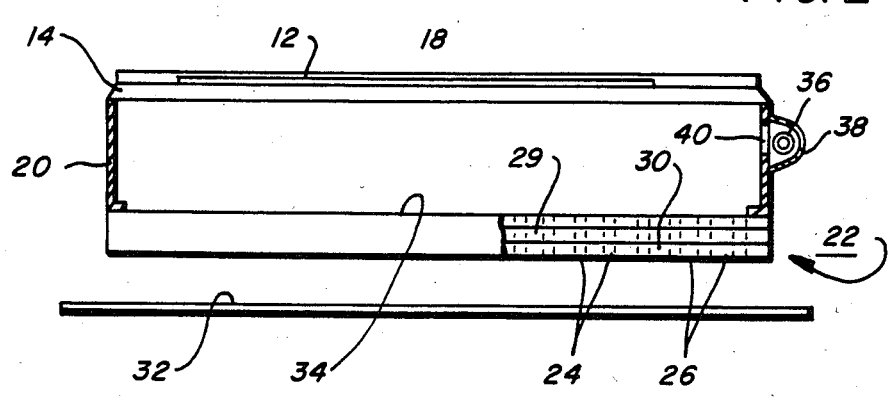

FULL-FRAME ILLUMINATION AND IMAGING SYSTEM

BACKGROUND AND PRIOR ART STATEMENT

The present invention relates generally to an illumination and imaging system for a document reproduction device and, more particularly, to an efficient full frame light source and lens assembly.

Prior art full frame document illumination and imaging systems generally employ a flash lamp or series of flash lamps combined with a projection lens to provide full frame exposure of a document at a photosensitive image plane. Representative systems are disclosed in U.S. Pat. Nos. 3,697,177 (Booth) and 4,333,723 (Green et al). These prior art systems offer relatively high throughput compared to the conventional scan/rescan systems but also have several disadvantages. The flash lamps and their power supplies and quench circuits add a significant expense to the imaging system. And, typically, a large enclosed housing with reflective interior surfaces is required to enhance efficiency, adding to the system cost.

The flash lamps used in these prior art systems are all located out of the optical path; light reaches the platen by reflection from mirrors; directly from the lamps; or indirectly from reflectors associated with the lamps. The light undergoes multiple reflections from the interior reflective walls of the illumination housing. A generally uniform level of illumination is required at the document object plane which is a transparent platen in a typical reproduction device. This uniform illumination level, in practice, has proven difficult to achieve.

Another type of full frame illumination device is disclosed in copending U.S. Applications (D/84077 and D/84063). Both applications are assigned to the same assignee as the present invention. In the first mentioned application, a full frame illumination source is realized by forming a two-dimensional array of discrete light sources in the body of a transparent substrate. The substrate has dimensions corresponding to the document sizes to be reproduced and is positioned between the document and a projection lens, either conventional, or full-frame. The light sources, when energized, provide the required illumination level at the document/platen interface. In the second application, a transparent document platen is modified so that light introduced into the platen from an outside source is directed to the document/platen interface by total internal reflection thereby providing the document illumination.

The present invention is directed to a more efficient and novel mechanism for providing a full frame illumination and imaging system. A document platen is modified so that the edges are ground and made diffusely reflective to incident light. A platen extension is attached to the bottom of the platen, the extension also having diffusely reflective sides. A full frame lens array, having reflective interstitial lenslet areas forms the bottom surface of the assembly. Light is introduced into either the platen and/or platen extension area. The entire platen/platen extension/lens array acts as an integrating cavity efficiently directing and redirecting the light so as to uniformly illuminate the document. The reflected light image is then projected by the lens array onto a flat photoreceptor surface.

More particularly, the invention relates to an illumination and imaging system for illuminating a document and for transmitting an image of said document onto a photosensitive surface, said illumination and imaging system comprising:

a generally transparent platen having diffusely reflective side surfaces for supporting the document to be reproduced, a light housing connected to the bottom of said platen in a light-tight manner, said housing having diffusely reflective interior side surfaces, a two-dimensional, full frame lens array connected to the bottom of said light housing in a light-tight manner, said lens array comprising a plurality of individual lenslets separated by opaque insulating material, the top surface of said lens array partially covered by a reflective layer formed between the lenslet interstitial array, and means for coupling illumination into the light housing, said illumination being diffusely reflected from said platen and light housing sides and from the interstitial lenslet area and document to provide a generally uniform level of illumination at the platen/document interface, a reflected image of the document being projected through the lens array onto the photosensitive surface.

FIG. 1 is a perspective view of a full frame illumination and imaging system according to the present invention.

FIG. 2 is a cross-sectional side view of the illumination and imaging system of claim 1.

DESCRIPTION

Referring now to FIGS. 1 and 2, there is shown a document and imaging system 10 according to the present invention. A document 12 is placed on the top surface of a platen 14 which has been modified by making side surfaces 16 diffusely reflective. Platen extension housing 18 is connected to the bottom surface of platen 14 in a light tight manner. Sides 20 of housing 18 are made diffusely reflective, preferably by coating with a reflective paint. Joined to the bottom of housing 18 is a two-dimensional focal length, full frame imaging array 22. Array 22 comprises a plurality of microlenses 24 separated by opaque insulating segments 26. The array is formed by stacking substrates 26, 28, 30 so that each lens element is coaxial along the optical path with the lens elements of the other substrates. At a 1:1 magnification, the position of the document within the field of view of adjacent lenslets is superimposed on one another to form a uniform continuous image at a flat photosensitive image plane 32. An exemplary lens array 22 is disclosed in a paper presented July 4, 1983 at the 4th Optical Meeting on "Gradient Index Optical Imaging Systems". The paper is printed on pages 224–227 of the "Technical Digest" of that conference and the contents of the paper are hereby incorporated by reference.

Continuing with a description of lens array 22, and according to one of the principles of the present invention, the interstitial areas between lenslets 24 on the top surface of the array are coated with a reflective material to form a continuous reflective layer 34.

Turning now to the illumination source, and in a preferred embodiment, a linear flash lamp 36 is completely enclosed in a light tight manner against the side of housing 18 by a reflector 38. A port 40, formed within the side 20 of housing 18, permits introduction of light from lamp 36, to the interior of housing 18. A power supply (not shown) provides power to the lamp.

The document and imaging system, as described above has been constructed to act as an integrating cavity to light introduced into its interior. The cavity, for optical purposes, can be considered to have a top surface comprising the document to be copied; side surfaces comprising the diffusely reflective sides of the platen 14 and of the extension housing 18 and a bottom surface comprising the reflective interstitial layer 34. Thus, when lamp 36 is energized and light enters the "cavity", it undergoes multiple reflections from all the interior surfaces, producing a uniform diffuse illumination at the bottom surface of the platen. Reflected light from the document is then projected onto photoreceptor belt 32 by lens array 22 to form the latent image. Of significance to the operation of the cavity is the fact that the light reflected from the document itself, as well as reflections from the interstitial reflective layer 34, undergoes additional reflections and contributes further to platen illumination. The latent image can be developed, transferred to a substrate sheet and a permanent image affixed, as is known in the art. These various xerographic steps, as well as charging and cleaning of belt 32 are disclosed, for example, in U.S. Pat. No. 4,318,610 whose contents are hereby incorporated by reference.

While the embodiment shown in FIGS. 1, 2 shows only one port in the side of housing 18, more than one port in more than one location may be used. For example, multiple ports in different sides of housing 18 and/or the side of platen 14 may be employed.

For a preferred embodiment, platen 14 is made of a soda lime composition. Housing 18 is a lightweight material such as opaque plastic. The sides of platen 14 and housing 18 and the lens array interstitial area have a reflective coating of a high reflectivity (90%) material such as Glidden Enamel No. 424-W-02100 in cellosolve acetate thinner. The flash lamp 36 can be a xenon type flash lamp.

While the invention has been particularly described and shown with reference to preferred embodiments thereof, it is to be understood by those skilled in the art that variations and modifications may be made without departing from the spirit of the invention. For example, while the image is shown as being formed on a photoreceptor belt, other photosensitive members such as a full frame CCD array may be used as the image plane. In this case, suitable electric signals would be generated by the exposed portion of the array and used to operate a marking device to form the reproduced output image.

What is claimed is:

1. An illumination and imaging system for illuminating a document and for transmitting an image of said document onto a photosensitive surface, said illumination and imaging system comprising:

a generally transparent platen having diffusely reflective side surfaces for supporting the document to be reproduced, a light housing connected to the bottom of said platen in a light-tight manner, said housing having diffusely reflective interior side surfaces, a two-dimensional, full frame lens array connected to the bottom of said light housing in a light-tight manner, said lens array comprising a plurality of individual lenslets separated by opaque insulating material, the top surface of said lens array partially covered by a reflective layer formed between the lenslet interstitial array, and means for coupling illumination into the light housing, said illumination being diffusely reflected from said platen and light housing sides and from the interstitial lenslet area and document to provide a generally uniform level of illumination at the platen/document interface, a reflected image of the document being projected through the lens array onto the photosensitive surface.

2. The illumination and imaging system of claim 1 wherein the photosensitive surface is a photoreceptor belt.

3. The illumination and imaging system of claim 1, wherein the light housing has at least one aperture in at least one of the side walls and wherein said illumination coupling means is a lamp placed in proximity to said aperture, said lamp adapted to be periodically energized and direct light through said aperture into said housing.

* * * * *